US006595053B2

(12) United States Patent
Parker

(10) Patent No.: US 6,595,053 B2
(45) Date of Patent: Jul. 22, 2003

(54) BALANCE CORRECTION SYSTEM WITH ON-CAR RUNOUT DEVICE

(75) Inventor: Paul Daniel Parker, Kirkwood, MO (US)

(73) Assignee: Hunter Engineering Company, Bridgeton, MO (US)

( * ) Notice: Subject to any disclaimer, the term of this patent is extended or adjusted under 35 U.S.C. 154(b) by 57 days.

(21) Appl. No.: 09/939,504

(22) Filed: Aug. 24, 2001

(65) Prior Publication Data

US 2003/0041666 A1 Mar. 6, 2003

(51) Int. Cl.$^7$ .................................. G01M 1/12
(52) U.S. Cl. ........................... 73/462; 73/468
(58) Field of Search .................. 73/462, 460, 466, 73/467, 457, 458, 468, 487; 700/279

(56) References Cited

U.S. PATENT DOCUMENTS

| | | | | |
|---|---|---|---|---|
| 3,580,064 A | * | 5/1971 | Bar-on | 73/146 |
| 3,780,592 A | * | 12/1973 | Merrilees | 73/457 |
| 5,103,595 A | | 4/1992 | Dale et al. | 51/165 |
| 5,279,192 A | * | 1/1994 | Hartman | 82/112 |
| 5,396,436 A | | 3/1995 | Parker et al. | 364/508 |
| 5,974,878 A | * | 11/1999 | Newell et al. | 73/462 |

OTHER PUBLICATIONS

"On–Vehicle Wheel Balancing Systems", Hunter Engineering Company, 2000.*
General Motors Corporation Service Bulletin No. 83–30–04 dated Sep. 1998.

* cited by examiner

Primary Examiner—Helen Kwok
(74) Attorney, Agent, or Firm—Thompson Coburn LLP; Gregory E. Upchurch; Caroline G. Chicoine

(57) ABSTRACT

A device and method for reducing on-car runout and imbalance in a tire/wheel assembly. An on-car runout device has a powered roller that rotates the tire/wheel assembly while it is mounted on the vehicle hub and a runout measuring device that measures the runout of the vehicle hub and a surface of the tire/wheel assembly. The on-car runout device can operate in combination with an off-car balancer in an integrated balancing system, and a computer determines the optimal position and amount of weights to reduce the imbalance. The on-car runout device also minimizes the runout in a tire/wheel assembly by automatically optimizing the position of the tire/wheel assembly relative to the runout of the vehicle's hub. Additionally, when the on-car runout device communicates with an off-car balancer, the integrated system can calculate the balance weights needed to counteract differences in imbalance forces in the tire/wheel assembly due to changes in the tire/wheel assembly's mounting between the off-car balancer and the vehicle hub.

32 Claims, 10 Drawing Sheets

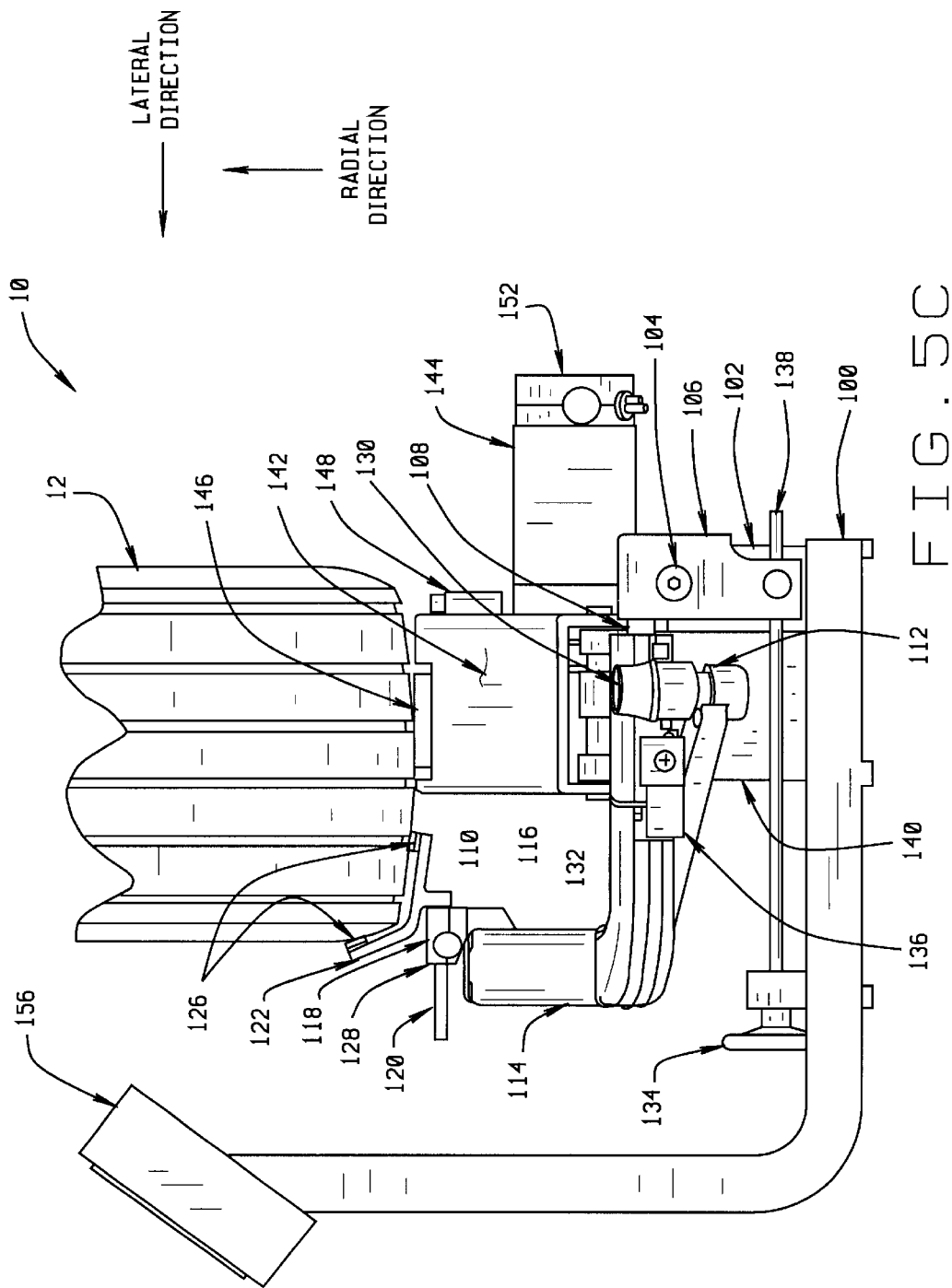

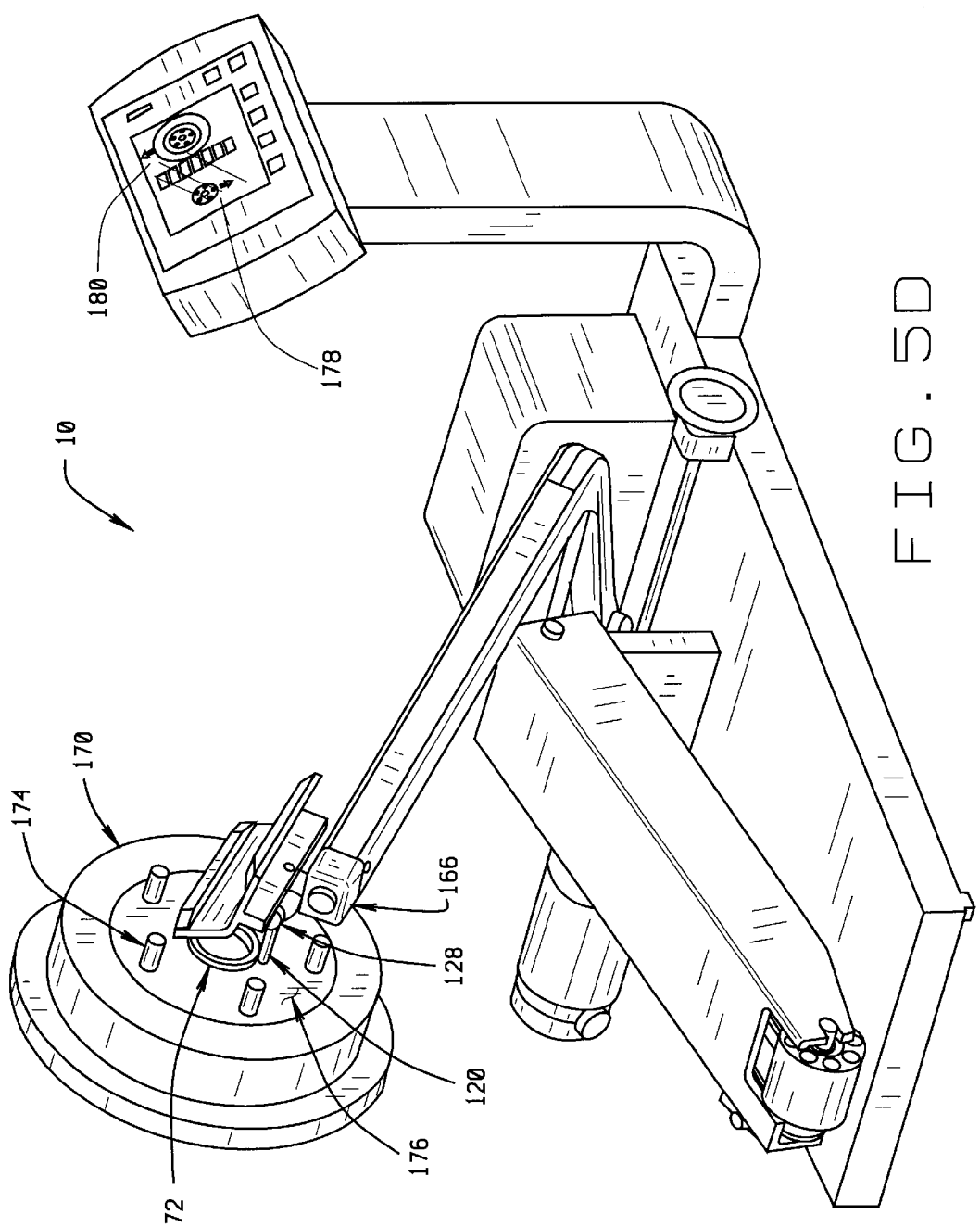

BALANCE CORRECTION SYSTEM WITH ON-CAR RUNOUT DEVICE

CROSS-REFERENCE TO RELATED APPLICATIONS

None.

Statement Regarding Federally Sponsored Research or Development.

Not Applicable.

BACKGROUND OF THE INVENTION

1. Field of the Invention

This invention relates generally to motor vehicle wheel balancing systems, and more particularly to a runout measuring device for improving the mounting of a vehicle tire/wheel assembly on a vehicle hub.

2. Related Art

A motor vehicle's ride quality is greatly influenced by the balance of the wheels it rides on. The balancing of vehicle wheel assemblies is most often accomplished by removing the tire/wheel assemblies from the vehicle and mounting each of the tire/wheel assemblies on an off-car-balancer. The off-car balancer rotates the tire/wheel assembly, measures the imbalance forces and displays the amount and location of weight to add to the wheel to bring the tire/wheel assembly into a balanced condition. International Standard ISO 1925 (1990) by International Organization for Standardization, incorporated by reference herein, defines balancing terms such as single-plane balance, two-plane balance, couple unbalance, dynamic unbalance, residual unbalance, and principal inertia axis.

Some off-car balancers, such as the Hunter GSP 9700 Vibration Control System, also measure lateral runout and radial runout of the rim and loaded runout of the tire's outer diameter to help match the mounting of the tire to its rim. Runout is the amount that a surface's trajectory, runs out of a true circle centered about the axis of rotation. Lateral runout is measured parallel to the axis of rotation, and radial runout is measured perpendicular to the axis of rotation.

The runout measurements can be expressed using a variety of mathematical terms. The first harmonic, once per revolution, discrete Fourier transform is one term that can be used to express runout. Another term that can be used is total indicator reading (TIR), which is the maximum deviation of any point on the surface from a true circle minus the minimum deviation of any point on the surface from the true circle. As described in U.S. Pat. No. 5,103,595, the least squares best fit method can also be used to express runout. The high spot of runout or the location of maximum runout is the angular location about the axis of rotation at which the mathematical term being used to express runout is at its maximum value.

The runout of the outer surface of a tire measured using a typical tire load is often quite different than unloaded runout, the runout measured without load. This is caused by circumferential variations of tire stiffness and the tire deflection when supporting the weight of a vehicle. Off-car balancers with runout measuring capability are useful in matching a tire to its respective rim, especially when the rim is designed with some runout to offset runout in the tire. The high spot of loaded runout of the tire is matched with the low spot of the rim to obtain an assembly with minimum loaded runout. A tire/wheel assembly must have a low level of loaded runout as well as a low level of imbalance in order to operate free of vibration on the vehicle.

Loaded radial runout of a tire is a useful measurement of tire uniformity that corresponds to the amount of vibration that the tire will impart to the vehicle. Tire uniformity measuring machines can quantify the force variation of a tire and are often used by tire manufacturers to inspect tires. The Society of Automotive Engineers Recommended Practice J332 (August 1981), included by reference herein, describes the design requirements for such measuring machines and defines force variation. Loaded radial runout and force variation are closely related. The high spot of force variation is usually the high spot of loaded radial runout, and loaded radial runout multiplied by the stiffness of a tire is a good approximation of the force variation of a tire. Additionally, the angular location of maximum radial force variation is substantially the same as the location of maximum radial loaded runout.

With the use of computers, modem vehicle wheel balancers are capable of imbalance measurements repeatable to within a few hundredths of an ounce when a vehicle tire/wheel assembly remains mounted on the balancer between measurements. The repeatability of the measurements is reduced when the tire/wheel assembly is removed from the balancer and remounted between spins. A primary cause for loss in repeatability is inaccurate mounting of the tire/wheel assembly on the balancer. Errors can be introduced by clearance between the cone and the balancer shaft, runout in the balancer cone or shaft, runout in the hub face, and imbalance in the balancer.

Although a tire/wheel assembly may be balanced so that it produces negligible forces when rotated on the off-car balancer, the same assembly may cause significant imbalance forces when mounted on the vehicle and rotated using the vehicle's bearings and axle. The imbalance forces of a tire/wheel assembly will remain constant between the off-car balancer and the vehicle only if the relationship between the tire/wheel assembly and the axis of rotation is the same for the two mountings. Achieving the desired on-car wheel balance with only an off-car balancer involves both accurately mounting the wheel on the balancer and then accurately mounting the tire/wheel assembly on the vehicle's hub. Possible causes of wheel to vehicle mounting inaccuracy include clearance between the balancer hub and the rim pilot hole, runout of the hub pilot diameter or mounting face, rust or grime between rim and vehicle hub, runout in studs and runout in lug nuts.

On-car balancers can eliminate some of the mounting accuracy problems by performing the balance measurements after the tire/wheel assembly is in its final mounted position on the vehicle. Although on-car balancers are available, they are not very popular because of setup difficulties, operational limitations, and safety issues. To install an on-car balancer, an instrumented jack stand must be mounted under the lower suspension member at each tire/wheel assembly. For best accuracy, the calibration of on-car balancers must be adjusted for each vehicle. It is also important that the jack stand is mounted securely on the suspension next to the tire/wheel assembly because the assembly must be spun at a high speed. However, operators generally find it difficult to ensure that the jack stand is properly mounted, causing safety concerns. Additionally, on-car balancers only output the amount and angle of a single weight to attach to the wheel, and they cannot compute the best distribution of the correction weight between the inner and outer rim flanges. On-car balancers are also called finish balancers because an off-car two-plane balance is typically performed on a tire/ wheel assembly before it is mounted to the vehicle, and then the on-car static balance is performed.

SUMMARY OF THE INVENTION

It is in view of the above problems that the present invention was developed. The invention described herein preferably includes an off-car balancer, an on-car runout device, and a computer that receives information from the off-car balancer and the on-car runout device. The off-car balancer preferably includes a runout measuring device and a tire uniformity measuring device that respectively measure the runout of two surfaces of the tire-wheel assembly and measure the loaded radial runout, or radial force variation, of the tire/wheel assembly. The on-car runout device measures the vehicle hub to determine the radial runout of the wheel mounting studs, the radial runout of the hub pilot diameter and the lateral runout of the hub face. The on-car runout device also measures the runout of the tire/wheel assembly as it is mounted on the vehicle hub. The on-car runout is preferably measured at two surfaces, and the two surfaces are the same surfaces on the tire/wheel assembly that are measured by the runout measuring device of the off-car balancer. The computer calculates a preferred orientation of the vehicle hub and the tire/wheel assembly and can calculate the magnitude and location of weights for a two-plane balance. The computer preferably includes a user interface to display results to the operator. The on-car runout device and the computer can alternatively be used apart from the off-car balancer to counteract runout in the vehicle hub.

A first advantage of the present invention is to provide an on-car runout device that automatically minimizes the loaded runout of a tire/wheel assembly when mounted on a vehicle hub.

A second advantage of the present invention is to provide an on-car runout device that reduces imbalance in a tire/wheel assembly when mounting the tire/wheel assembly on a vehicle hub.

A third advantage of the present invention is to provide an on-car runout device that can be used in combination with a tire uniformity measuring device to reduce vibration by determining the preferred mounting orientation of a tire/wheel assembly relative to a vehicle hub.

A fourth advantage of the present invention is to provide an on-car runout device integrated into a system that automatically calculates the proper mass and placement of a weight to reduce single-plane imbalance in a tire/wheel assembly when mounted on a vehicle hub.

A fifth advantage of the present invention is to provide a method for determining two-plane imbalances caused by inaccurate mounting of the wheel on a vehicle hub or on an off-car balancer.

A sixth advantage of the present invention is to determine and correct for hubcap induced wheel imbalances.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 5*c* is a front elevation view of the two plane on-car runout device in operation with a tire/wheel assembly.

FIG. 5*d* is a perspective view of the two plane on-car runout device in operation with a vehicle hub.

DETAILED DESCRIPTION OF THE PREFERRED EMBODIMENTS

Figure 1:
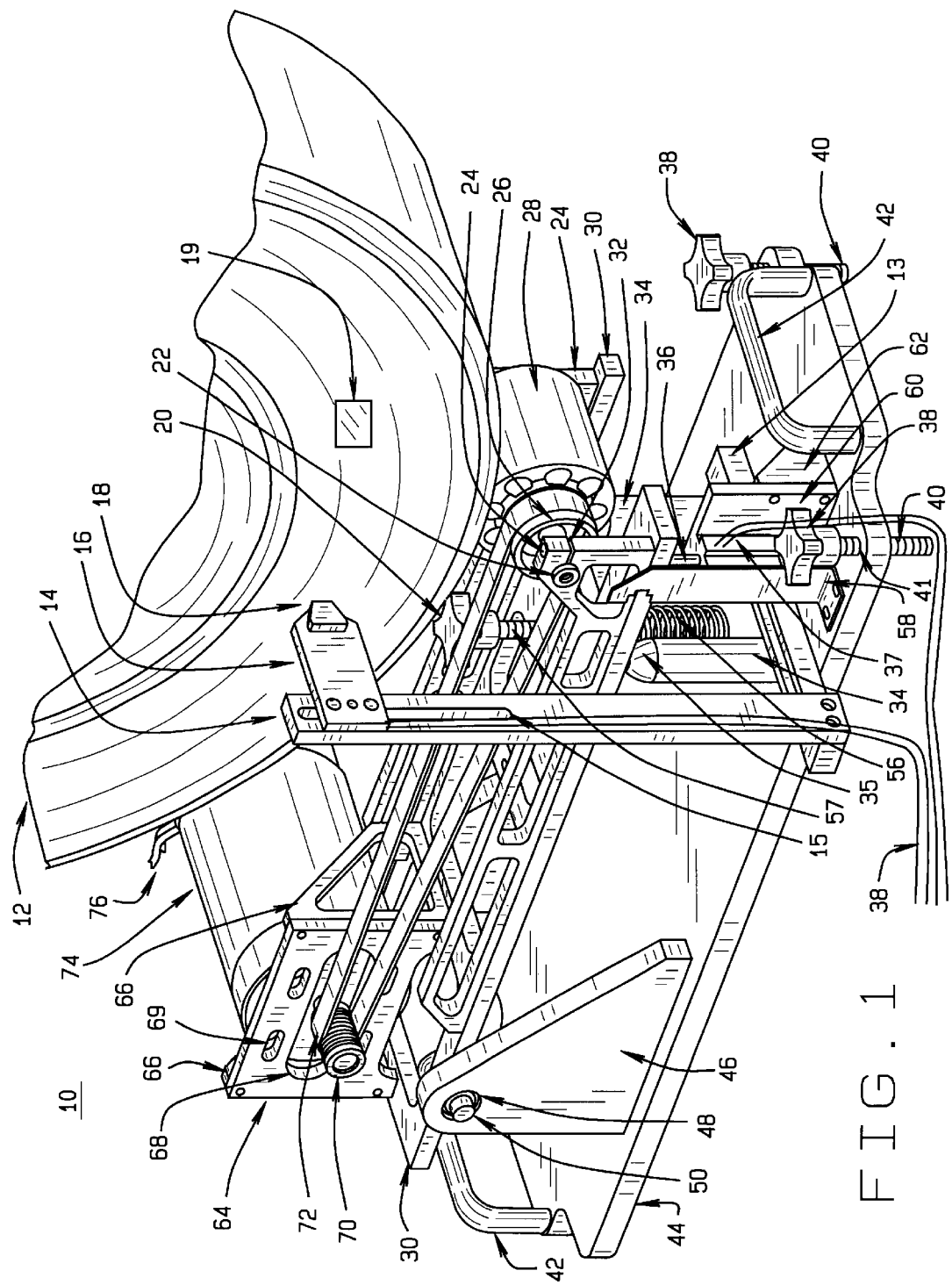
FIG. 1 is a perspective view of the on-car runout device according to the present invention.

Referring to the accompanying drawings in which like reference numbers indicate like elements, FIG. 1 illustrates the mechanical aspects of a first embodiment of an on-car runout device 10. In this embodiment, the on-car runout device 10 measures runout at one location on the tire and can be used to achieve a single-plane on-car balance correction. A horizontal base plate 44 is provided with a pair of handles 42 and sits on three adjustable screw legs 40. Rotation of the three legs 40 alters the attitude of the base plate 44 for aligning purposes. Two support plates 46 extend upward from plate 44 and rotatably secure one side of support member 30 through horizontal axis pins 50. Support member 30 extends horizontally above base plate 44 and is supported at its other end by an adjustable screw 20 that is attached to the upper end of spring 56. The lower end of the spring 56 is fixed to the base plate 44 and its compression is controlled by the adjustable screw 20.

Coupled to the support member 30 is a vertical plate 64 and a pair of cross braces 66. The vertical plate and cross braces attach motor 74 to the support member. Power to the motor is supplied through cord 76 and causes the motor to rotate axle 70 that extends through aperture 68 and to thereby drive belt 72. The belt loops around drive cylinder 26 and rotates roller 28 about axle 22 that is rotatably connected to a pair of vertical support structures 24 that are fixed to the support member. The roller is raised and lowered by varying the compression on the spring such that in the raised position, the roller contacts the tire/wheel assembly 12 at its tread surface.

Sight guide element 58 is attached to and stems upward from base plate 44 and includes a sight line notch 59 at its upper end to visually inspect the relative inclination of support member 30 with respect to the base plate. The extent of downward movement of member 30 is limited by bumper cap 35 on bumper shafts 34 anchored to the base plate.

Sensor connections 38 are made to both a potentiometer sensor 37 and an optical sensor 18. The potentiometer sensor 37 outputs an analog signal whose voltage level is proportional to the position of the roller support member 30. Optical sensor 18 outputs a voltage change when a piece of reflective tape 19 passes. One piece of reflective tape 19 is placed on the tire to produce this once per revolution pulse. The potentiometer sensor is secured at its lower end to base plate 44 through a sensor housing 60. A measuring rod 36 extends upward from the sensor to contact the lower side of member 30. The optical sensor 18 faces the sidewall surface of the tire through its sidable attachment to shaft 14. At its lower end, the shaft is slidably secured to the base plate through a horizontal bar 13. The sensor connections 38 communicate with a processor, transmitting the measurements to the processor, and the processor automatically performs runout calculations.

Figure 2:
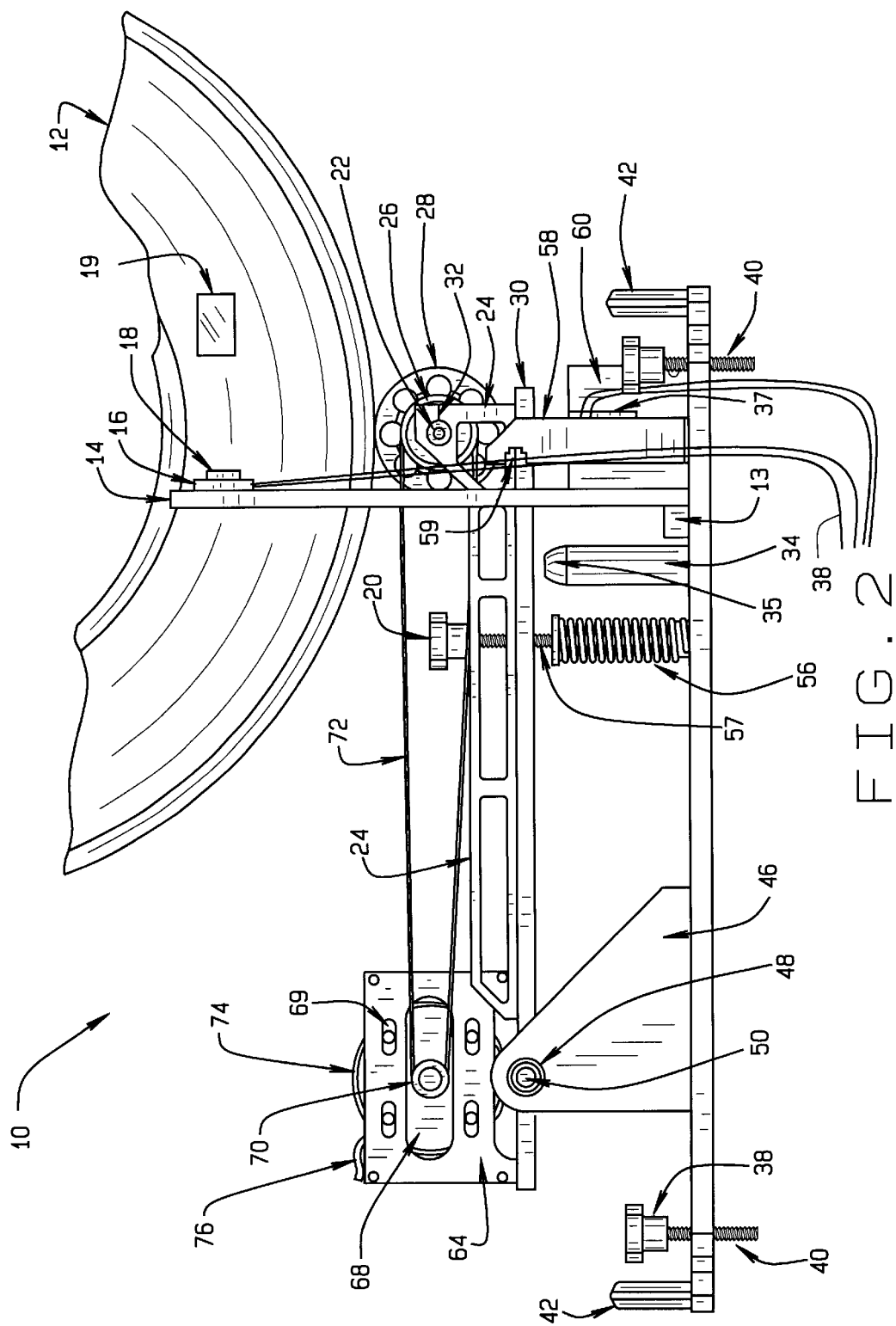
FIG. 2 is a side elevation view of the present invention.
Figure 3:
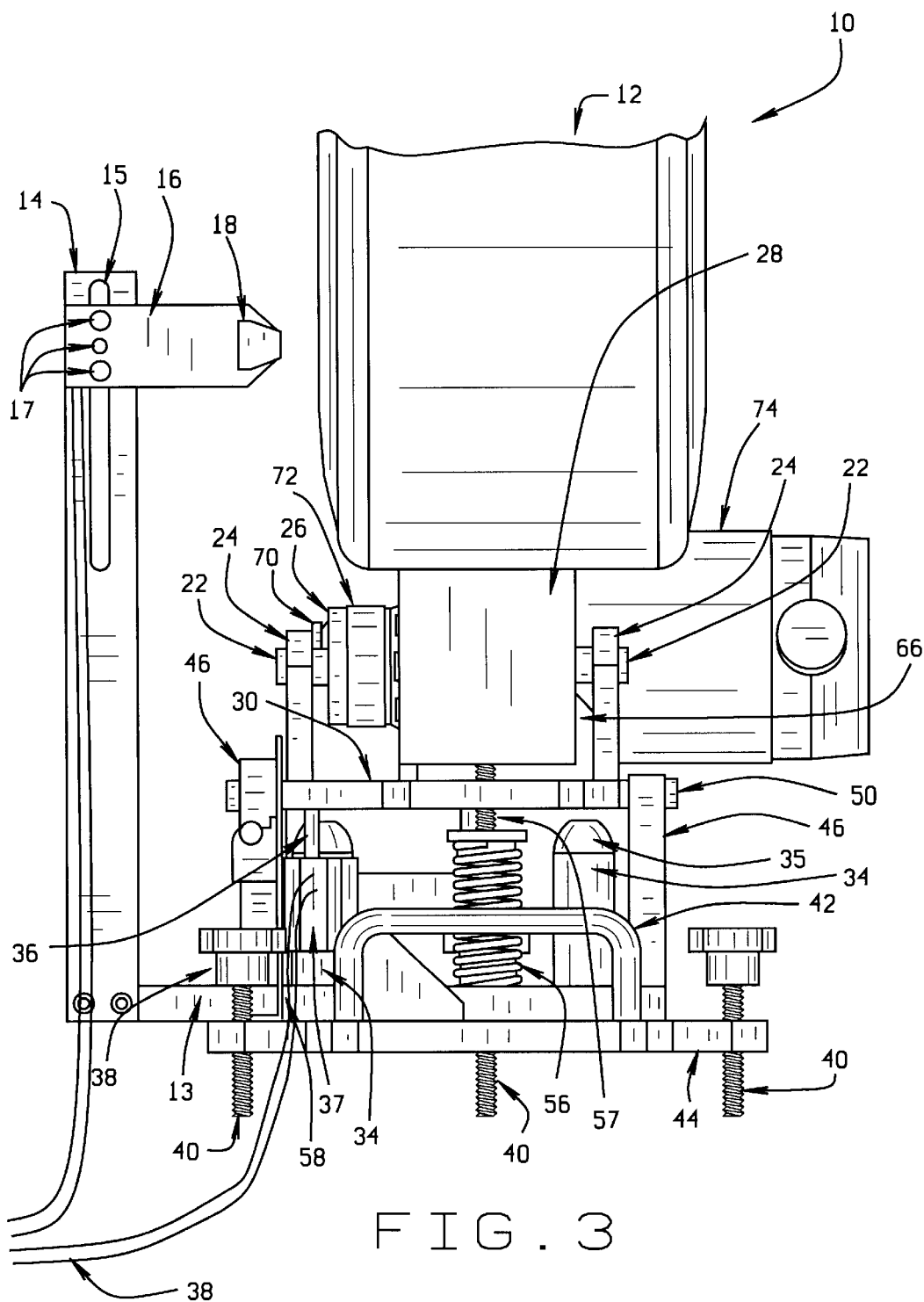
FIG. 3 is a front elevation view of the present invention.
Figure 4:
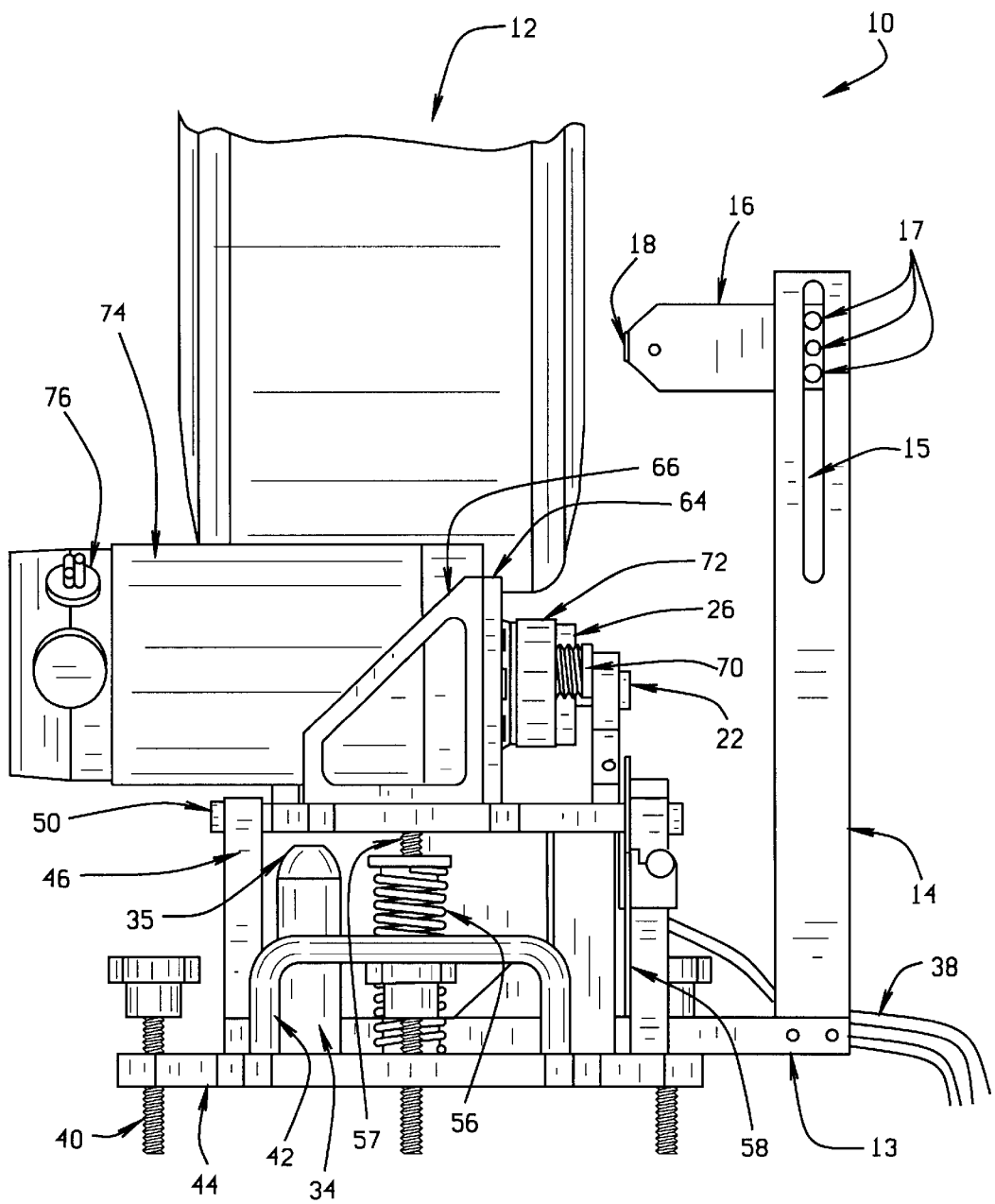
FIG. 4 is a rear elevation view of the present invention.
Figure 5A:
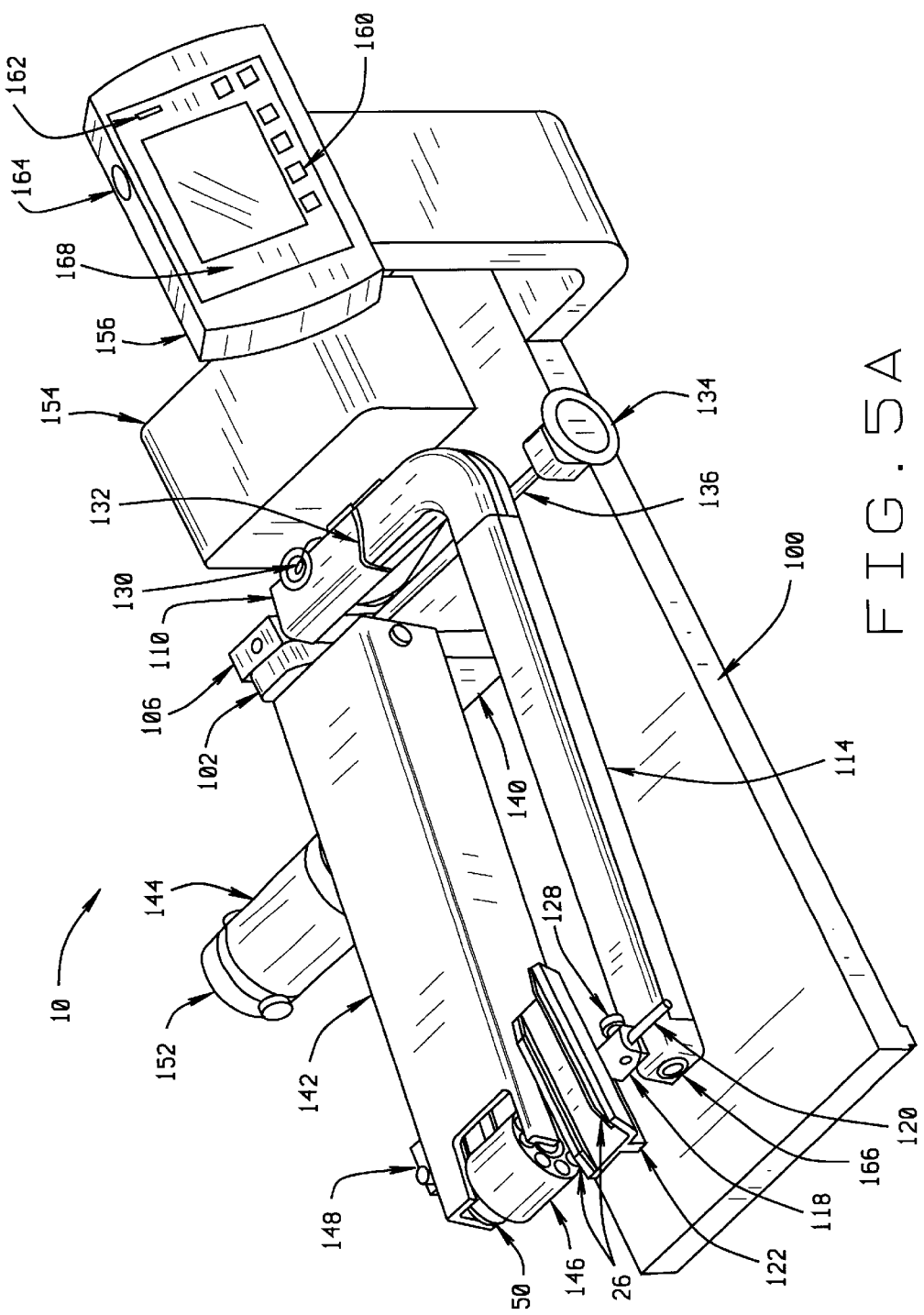
FIG. 5*a* is a perspective view of an alternative embodiment of the on-car runout device capable of two-plane measurements.
Figure 5B:
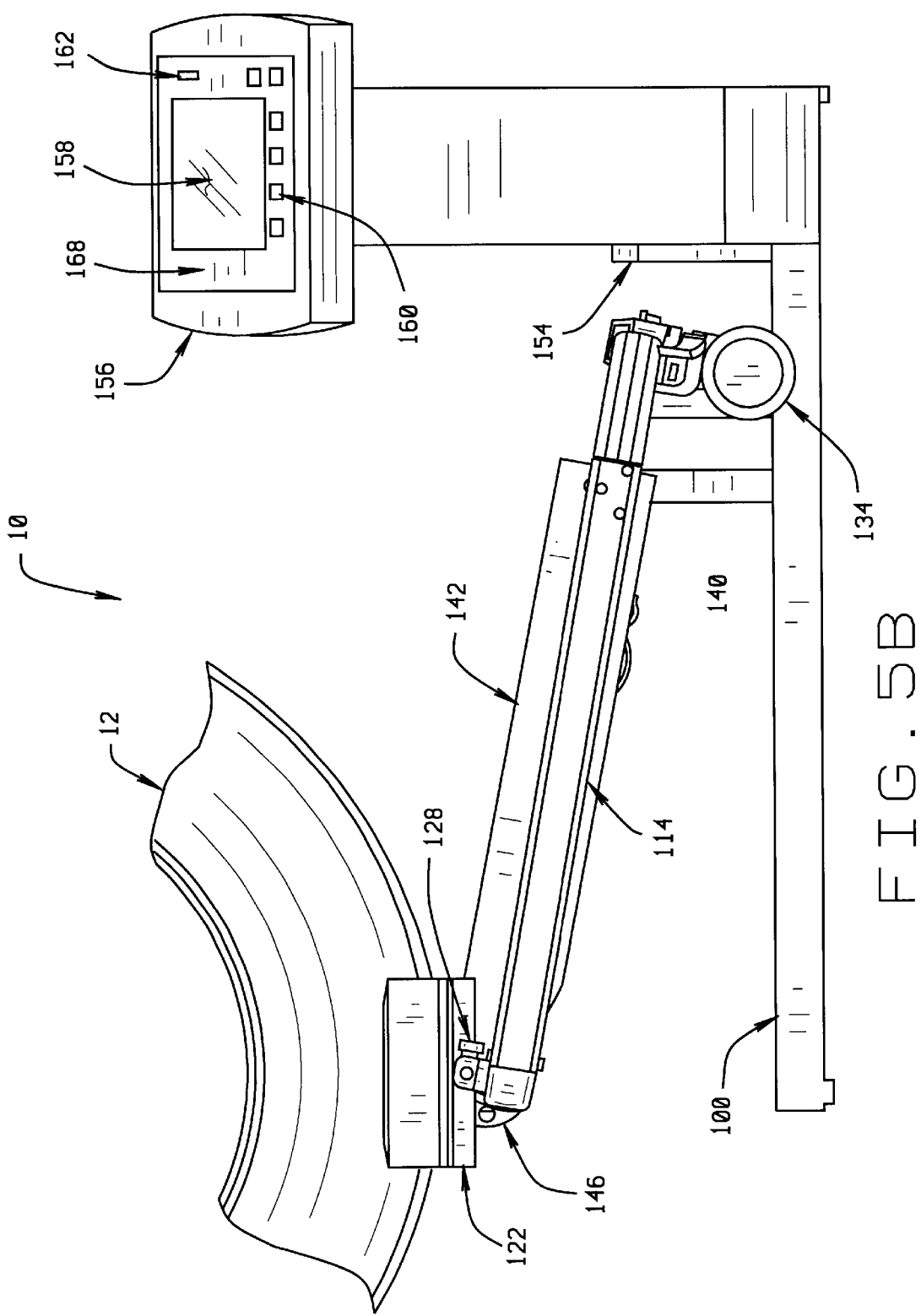
FIG. 5*b* is a side elevation view of the two-plane on-car runout device in operation with a tire/wheel assembly.

FIG. 2 shows a side-view of the on-car runout device 10 providing a detailed depiction of the front to rear arrangement of the components. From this view, the attachment of the motor 74 to the cross braces 66 is shown to be through the four slots 69 therein. FIGS. 3 and 4 show a front and rear view, respectively, of the on-car runout device 10 and provides detailed illustrations of the side to side and vertical arrangement of the components as well as a particular illustration of adjustment pins 17 locking cross strut 16 within slot 15.

In its preferred embodiment, the on-car runout device 10 forms part of an integrated balancing system 200 that includes an off-car balancer 202 (FIG. 6) and makes two-plane, on-car imbalance corrections. Another embodiment of the on-car runout device 10 is shown in FIGS. 5a, 5b, 5c and 5d in which measurements can be made of both radial runout and lateral runout. Power box 154 is removed from the on-car runout device 10 in FIG. 5c.

Support block 102 is fixed to horizontal base 100. Shoulder screw 104 is fastened into support block 102 and mounting plate 106 is pivotally attached thereto by shoulder screw 104. Horizontal sensor shaft 108 is rigidly attached to mounting plate 106 and sensor housing 110 rotates about this shaft. Vertical sensor shaft 112 rotates inside the sensor housing 110, and arm 114 is rigidly attached to this shaft. Arm 114 is "L" shaped, being connected to shaft 112 at its proximal end and being attached to a vertical pivot pin 116 at the distal end, and is preferably made using tubular construction to minimize weight. Pivot block 118 rotates about vertical pin 116 and horizontal pivot pin 120 is mounted though a hole in pivot block 118. Measurement shoe 122 is rigidly attached to horizontal pin 120. Measurement shoe 122 contacts tire/wheel assembly 12 at two contact strips 126.

As tire/wheel assembly 12 is rotated, any runout in the tire/wheel assembly 12 will cause measurement shoe 122 to move in the radial and or lateral directions. The movement of the measurement shoe 122 in the lateral direction is translated into an electric signal by lateral angle sensor 130 which is fixed to sensor housing 110. The movement of the measurement shoe 122 in the radial direction is translated into an electric signal by radial angle sensor 132 which is fixed inside sensor housing 110 in-line with horizontal sensor shaft 108. Angle sensors 130 and 132 utilize a linear hall-effect sensor, such as part number A3516LUA manufactured by Allegro. The hall effect sensor outputs a voltage which is proportional to the magnetic field though it. A rare earth permanent magnet is fixed to sensor shafts 112 and 108 to create the magnetic field.

Pivot block 118 can be rotated 180 degrees from the position shown in FIG. 5c so that the distal end of pivot shaft 120 is pointing toward the vehicle hub 170. Knob 128 can be used to lock pivot block 118 rigidly to arm 114. In this position, the end of pivot shaft 120 can be used to measure the runout of the vehicle hub 170 Push button 166 is used to start the measurement process. When making radial hub runout measurements on the pilot diameter 172 and studs 174 and when making lateral runout measurements on mounting face 176, push button 166 is pressed each time the operator rotates the vehicle hub 170 to the next angular location.

Hand wheel 134 is fixed to threaded shaft 136 and can be turned, causing sensor housing 110, arm 114 and parts attached thereto to rotate about shoulder screw 104. For proper measurement of runout, hand wheel 134 should be turned until the horizontal axis of sensor housing 110 is roughly parallel with the axis of the vehicle hub 170. Rubber stop bar 138 limits the motion of arm 114.

Drive support bar 140 is fixed to base 100. Drive arm 142 is pivotally attached to support bar 140. Mounted on drive arm 142 is drive motor 144, roller 146 and optical sensor 148. Roller 144 is used to automatically turn the tire/wheel assembly 12 for runout measurements and for attaching balance weights. Belt 150 is used to transmit torque from motor 144 to roller 146. Optical sensor 148 is used to obtain a signal once per revolution of the tire /wheel assembly 12. Sensor 148 gives a signal each time a chalk mark or piece of reflective tape placed on the tire passes the sensor. Angle encoder 152 measures the angle of the motor shaft. Information from encoder 152 as well as optical sensor 148 is used to rotate the tire wheel assembly to the proper angular location for weight application. Power box 154 powers the electronics and drive motor 144 as well as power control relays and circuitry and could also house a battery as a power source. Control box 156 contains a LCD display 158 and computer processor 168 which is used to calculate runout and imbalance values and also used for motor control. Communication wires (not shown) from angle sensors 130, 132, 152, optical sensor 150, push button 166 and power box 154 run through base 100 and up into control box 156. Also mounted on control box 156 are push buttons 160 and input knob 162 for receiving operator input, and an input port 164 for receiving information automatically from the off car balancer 202.

The on-car runout device 10 does not need to rotate the tire/wheel assembly 12 as fast as on-car balancers because the on-car runout device 10 does not need to measure imbalance forces. On-car balancers typically require steadily rotating the wheel at or above approximately 500 rotations per minute (RPM), whereas the on-car runout device 10 preferably operates at speeds below 200 RPM. Although the on-car runout device 10 can operate above 200 RPM, such as 300 RPM, slower steady speeds are preferred for safety considerations. For such slower steady speeds, the on-car balancers are unable to obtain accurate force information necessary to correct for imbalances in the tire/wheel assembly.

The on-car runout device 10 is also unlike on-car balancers because the on-car runout device 10 can also measure runout of the vehicle's hub 170. In particular, before the tire/wheel assembly 12 is mounted onto the vehicle's hub 170, the radial angle sensor 132 measures the radial runout of the vehicle hub's mounting studs 174, preferably at their outer diameter, and the hub pilot diameter 172. Lateral angle sensor 130 measures lateral runout of the hub face 176 and the processor 168 determines the hub's high spot using its calculations of runout and instructs the operator on the preferred orientation of the vehicle hub 170 for placement of the tire/wheel assembly 12. Preferably, the computer processor 168 is part of a system including a display 158 or some other form of user interface, such as a printer (not shown), that illustrates the proper placement of the wheel and indicates whether the runout values are beyond predetermined limits.

Figure 6:
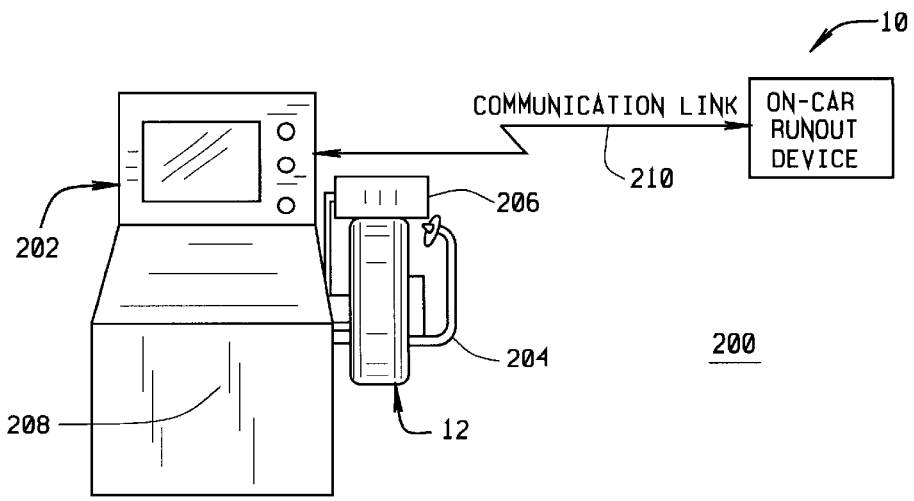
FIG. 6 is an on-car runout device in communication with an off-car balancer.

As illustrated in FIG. 6, the preferred embodiment of the invention includes the on-car runout device 10 as part of an integrated balancing system 200 that includes an off-car balancer 202. The off-car balancer 202 preferably has a runout measurement apparatus 204, a tire uniformity measuring device 206, and a computer 208, such as in the Hunter GSP 9700 Vibration Control System. In the preferred embodiment of the integrated balancing system 200, the on-car runout device 10 and the off-car balancer 202 are operatively connected through a communication link 210.

The on-car runout device 10 and tire uniformity measuring device 206 can operate together to reduce radial runout when mounting the tire/wheel assembly 12 onto the vehicle hub 170. Although the tire uniformity measuring device 206 is preferably a part of the off-car balancer 202, it may be a stand-alone unit. The tire uniformity measuring device 206 measures loaded radial runout of the tire/wheel assembly 12 to identify the high spot of loaded radial runout for the tire/wheel assembly 12. The on-car runout device 10 measures the runout of the studs 174 and the processor 168 automatically identifies the stud that is farthest from the axial center. The processor 168 directs the operator to place the tire/wheel assembly 12 on the vehicle hub 170 such that the high spot is axially opposite from the identified stud. Preferably, the identified stud is positioned near bottom-dead-center 178, the 6 o'clock position, to maximize the pulling effect of the stud when its lug nut is tightened and the high spot of loaded radial runout for the tire/wheel assembly 12 is positioned near top-dead-center 180, the 12 o'clock position, to take advantage of gravity pulling the tire/wheel assembly down as the lug nuts are tightened. In this manner, the on-car runout device 10 and tire uniformity measuring device 206 determine the preferred mounting orientation of the tire/wheel assembly 12 and the vehicle hub 170 to reduce vibration imparted to the vehicle.

The on-car runout device 10 should also measure the pilot surface 172 of the vehicle hub 170 to generate additional hub runout information. If the runout of the hub pilot surface 172 is greater than typical clearances with the tire/wheel assembly 12, approximately 0.003 inches or as otherwise indicated by the vehicle manufacturer, then the processor 168 should automatically select the runout of the hub pilot surface 172 in place of the runout of the studs 174. Accordingly, the processor 168 calculates the location of the maximum hub runout on the vehicle hub 170 and directs the operator to position the vehicle hub 170 such that the maximum hub runout is at bottom-dead-center 178. The processor 168 can also automatically display a warning when a runout limit is exceeded.

The on-car runout device 10 can similarly be used with new tires to reduce radial runout. Tire manufacturers often place a mark on a new tire to identify a unique force variation location on the tire. Depending on the tire manufacturer, the mark may identify either a high spot or a low spot for the force variation. The high spot of the tire is used as the high spot for the tire/wheel assembly and is positioned near top-dead-center 180. As described above, the on-car runout device 10 determines the maximum hub runout on the vehicle hub 170 and directs the operator to position the vehicle hub 170 such that the maximum hub runout is at bottom-dead-center 178.

The on-car runout device 10 can improve the mounting of the tire/wheel assembly 12 on the vehicle hub 170 when used independently, without forming a part of an integrated balancing system 200, no connection to a tire uniformity measuring device 206 or to an off-car balancer 202 and no tire uniformity information entered into the computer processor 168. As described above, the on-car runout device 10 determines the maximum hub runout on the vehicle hub 170. With no information about a force variation high spot for the tire/wheel assembly 12, the computer processor 168 directs the operator to position the runout high spot of the vehicle hub 170 at top-dead-center. Gravity pulls the wheel down onto the pilot surface 172 of the vehicle hub 170 and any gap between the wheel center hole and the vehicle hub pilot is at bottom-dead-center, opposite from and counteracting the runout high spot.

Returning to the preferred embodiment illustrated by FIG. 6, the integrated balancing system 200 includes the on-car runout device 10 and the off-car balancer 202. Without a data-link or digital communication between the off-car balancer 202 and the on-car runout device 10, the operator could manually enter information from the off-car balancer 202 into the on-car runout device 10. With the preferred communication link 210 between the off-car balancer 202 and the on-car runout device 10, no manual entry is necessary because the off-car balancer 202 and the on-car runout device 10 form the integrated balancing system 200. Additionally, the computer processor 168 in the on-car runout device 10 and the computer 208 in the off-car balancer 202 could be used, together or each one individually, as the processor for the entire integrated balancing system 200 because the communication link 210 can operate in real-time. Therefore, computations that could be performed by the on-car runout device 10 or alternatively by the off-car balancer 202 can be generally referred to as being performed by the integrated balancing system computer 168, 208.

The off-car balancer 202 includes runout measurement apparatus 204 to measure the runout of a selected surface or surfaces on the tire/wheel assembly 12 as it rotates thereon. The integrated balancing system computer 168, 208 uses a known method to determine the amount and angle of the runout. One such method uses a discrete Fourier transform and is described in U.S. Pat. No. 5,396,436. The computation method is similar to the method used to compute the imbalance except runout measurement data samples are substituted for the imbalance forces. The on-car runout device 10 measures the runout of the same tire/wheel assembly 12 when its is subsequently mounted on the vehicle's hub and rotated. To ensure that the measurements are correlated between the on-car runout device 10 and the off-car balancer 202, runout measurements must be taken from the same surface of the tire/wheel assembly 12.

Using equations that are discussed in detail below, the integrated balancing system computer 168, 208 can automatically calculate balance weights that will reduce imbalance forces in the tire/wheel assembly 12, including imbalance forces that are caused by changes in its mounting between the off-car balancer 202 and the vehicle hub 170. The process can be further automated by determining the angular location of the tire/wheel assembly 12 relative to the runout measurements made by the off-car balancer 202, as well as the measurements made by the on-car runout device 10. The integrated balancing system computer 168, 208, knowing the angular location of the tire/wheel assembly 12, can thereby direct the placement of the tire/wheel assembly 12 relative to the vehicle hub 170. Beginning with the tire/wheel assembly 12 at a defined angular orientation, the angle encoder 152 and the optical sensor 148 could provide real-time information on the angular location of the tire/ wheel assembly 12 as the on-car runout device makes its runout measurements.

One method to measure the angular location of the tire/wheel assembly 12 is to link the roller 28, 146 to an encoder. Another method of angular wheel orientation is to clip a small bar or wedge of material onto the tire tread at a defined angular location and detect the runout roller bouncing over this indicator, or alternatively placing a mark or piece of tape at a spot on the tire, it's passage detected by an optical sensor as discussed above. With the tire/wheel assembly spinning at a constant speed, the angular location of the runout measurements are determined by timing the intervals of the roller bouncing or the spot passing the optical sensor. Yet another method would be to temporarily attach an angular sensor directly to the vehicle hub.

Figure 7:
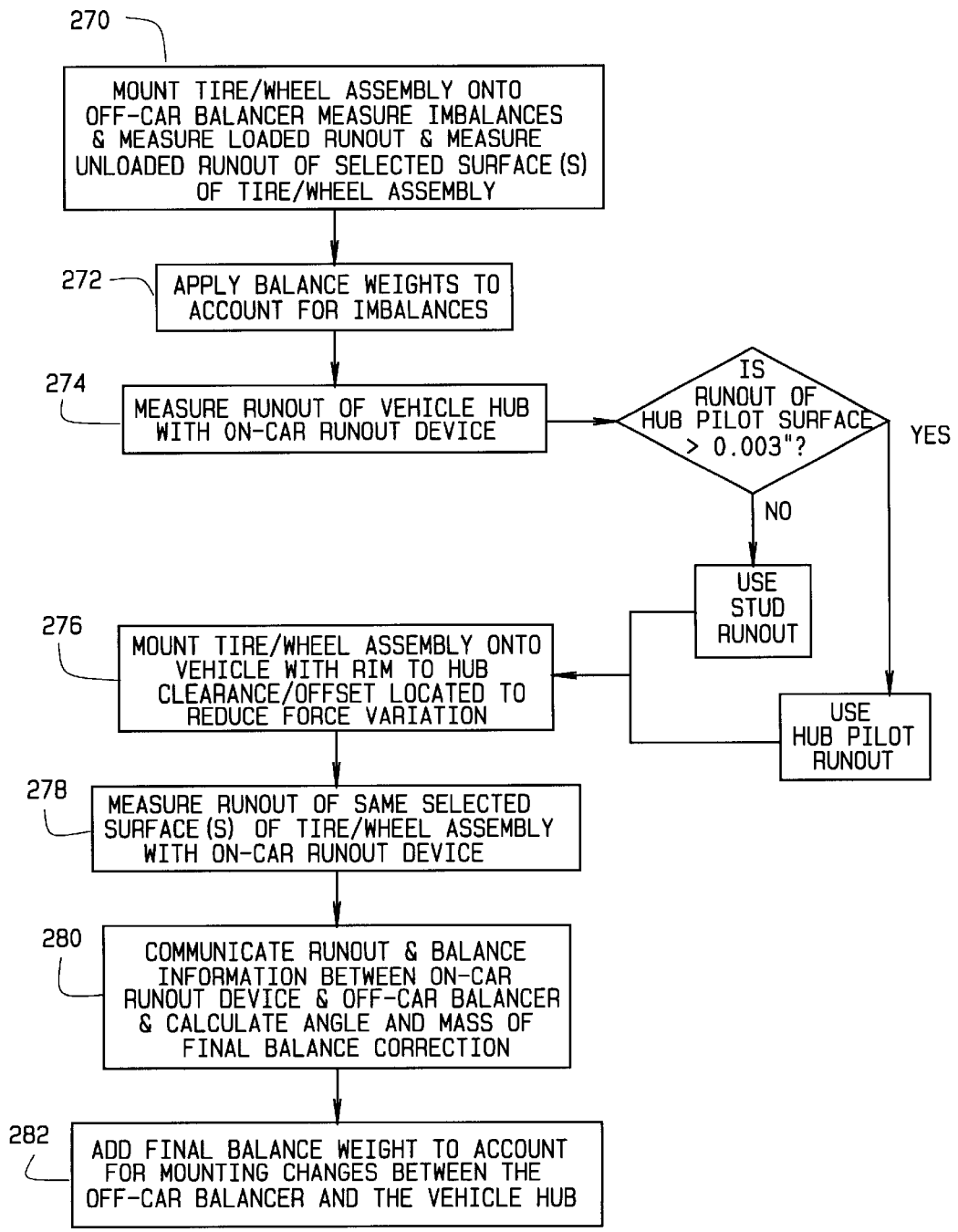
FIG. 7 is a flow chart illustrating the steps for an integrated balancing system.

The method for operating the off-car balancer 202 and the on-car runout device 10 as an integrated balancing system 200 is shown in FIG. 7. The operator mounts the tire/wheel assembly on the off-car balancer 270 and performs the standard operations to measure imbalances in the tire/wheel assembly. While the tire/wheel assembly is mounted on the off-car balancer, the runout measurement apparatus measures the unloaded runout of selected surface(s) of the tire/wheel assembly. Additionally, the tire uniformity measuring device measures the loaded radial runout of the tire/wheel assembly. The off-car balancer computer performs well known balance calculations, for either a static balance or a dynamic balance, and displays the amount and location of one or more wheel weights that are applied to the tire/wheel assembly to counteract the imbalance therein 272. The operator can measure the runout of the vehicle hub using the on-car runout device 274. The operator then mounts the same tire/wheel assembly on the vehicle hub 276. As discussed above, when the runout of the vehicle hub is measured, the high spot of the tire/wheel assembly from the tire uniformity measuring device should be mounted opposite the high spot of the vehicle hub. The operator engages the on-car runout device with the tire/wheel assembly and measures the unloaded runout from the same selected surface(s) of the tire/wheel assembly as measured by the off-car balancer 278. Runout measurements are communicated between the off-car balancer and the on-car runout device, as well as other information if desired, and the amount and location of weight to reduce the imbalance is automatically calculated according to either the static imbalance or the dynamic imbalance 280. The operator then applies the final balance weight to counteract changes in the tire/wheel assembly's mounting between the off-car balancer and the vehicle hub 282.

Computer calculations of the static imbalance use equation (1) below.

$$\vec{U}b = (-1)(\vec{R}oVeh - \vec{R}oBal)\left(\frac{WtWhl}{DiaUb}\right) \quad (1)$$

Where:

$\vec{U}b$=the vector value of the magnitude and angular location of the imbalance correction weight $\vec{R}Veh$=the vector value of the magnitude and angular location of the radial runout of the tire/wheel assembly surface while rotated on the vehicle's hub $\vec{R}oBal$=the vector value of the magnitude and angular location of the radial runout of the tire/wheel assembly surface while rotated on the off-car balancer WtWhl=the weight of the tire/wheel assembly DiaUb=the diameter where the imbalance weight will be placed As suggested above, with real-time communication between the computer processor 168 in the on-car runout device 10 and the computer 208 in the off-car balancer 202, the calculations of the amount and location of weight can be performed in either of integrated balancing system computer 168, 208. The communication link 210 between the off-car balancer 202 and the on-car runout device 10 can be a real-time connection as generally found in computer systems, and without exhausting the possibilities of real-time communications links, several such examples include a direct parallel interface, a universal serial bus (USB), a IEEE 1394 interface, or a wireless interface.

The unloaded runout measurements made on the off-car balancer 202, including the amount and angle of runout, can be communicated to the on-car runout device 10 to calculate the balance correction. Other information that is communicated includes the radial and axial locations where the unloaded runout measurements are taken, the loaded runout or force variation measurements to be used for locating wheel onto the vehicle hub, the wheel width, the rim diameter, the axial distance of the tire/wheel assembly from the side of off-car balancer, the overall diameter of the tire tread, the acceleration of the tire/wheel assembly on the off-car balancer, the lowest resonant frequency of the off car balancer vibration structure with the tire/wheel assembly mounted, and any residual imbalance left in tire/wheel assembly after performing the off-car balance.

The communication link 210 can also be sequential rather than real-time. For example, runout information from the off-car balancer 202 can be stored in an electronic memory device that is later read by the on-car measuring device 10 or the information can be manually input into the on-car runout device 10. For such a sequential operation, the computer processor 168 in the on-car runout device 10 would be used to perform the calculations. Some memory devices, such as the Dallas Semiconductor 1 Kbit Memory IBUTTON, may clip conveniently onto the valve stem of the tire/wheel assembly 12 and may transfer additional information from the off-car balancer 202 to the on-car runout device 10, such as the time of the off-vehicle measurement. Such a memory device can be configured with the valve stem as an angular reference position for the orientation of the angular position measurements that can be taken by the off-car balancer 202 and the on-car runout device 10, eliminating the need to place a mark on the tire. Other memory devices can be in the form of a card or a microchip.

Positioning the tire/wheel assembly 12 to the proper angular orientation relative to the off-car-runout measurement would provide the processor 168 of the on-vehicle runout device 10 with the angular location of the runout. The tire/wheel assembly's weight and imbalance weight placement diameter are other required inputs for the calculation of the correction weight magnitude and placement angle. An LED, liquid crystal display, or digitally indicated weight magnitude and bar graph can direct the operator how to implement the correction.

The novel process of using the on-car runout device 10 in communication with the off-car balancer 202 is provided here in more detail by way of a particular example. The operator first mounts the tire/wheel assembly 12 on the off-car balancer 202 and performs the imbalance measurement and correction in the normal manner. While the tire/wheel assembly 12 is mounted on the off-car balancer 202, the runout measurement apparatus 204 measures and records the amount and angular location of unloaded runout of a selected surface on the tire/wheel assembly 12. The off-car balancer 202 turns the tire/wheel assembly 12 several revolutions during runout data collection to improve accuracy. The tire uniformity measuring device 206 measures the loaded radial runout of the tire/wheel assembly 12. The high spot of loaded radial runout can be designated with a number placed at the correct angular location on the tire/wheel assembly 12.

As discussed above, the operator can measure the runout of the vehicle hub 170 using the on-car runout device 10 and when subsequently mounting the tire/wheel assembly 12 to the vehicle hub 170, the high spot of loaded radial runout measured by the tire uniformity measuring device 206 should be mounted opposite the high spot measured for the vehicle hub 170. When the tire/wheel assembly 12 is mounted on the vehicle hub 170, the on-car runout device 10 is positioned to measure the runout of the same surface on the tire/wheel assembly 12 as the same selected surface that was measured when the tire/wheel assembly 12 was on the off-car balancer 202. The on-car runout device 10 starts taking data samples. The tire/wheel assembly 12 is rotated a predetermined number of revolutions as the runout measurements are collected.

The off-car runout measurements are communicated from the off-car balancer 202 to the on-car runout device 10 and input into the processor 168 of the on-vehicle runout device 10. Other information that is input into the processor 168 includes the tire/wheel assembly weight, the wheel width, the overall diameter of the tire/wheel assembly, and the diameter and axial location at which any correction weight from the off-car balancer 202 is placed. The processor 168 calculates and displays the magnitude of the change in the imbalance correction weight. The processor 168 identifies the angular position on the tire/wheel assembly 12 where the correction is to be made. A shim may also be placed into the gap between the wheel center hole and the under side of the hub pilot surface just before the lug nuts are tightened to achieve the best wheel location.

When balancing the tire/wheel assembly 12 on the off-car balancer 202, a balance check measurement is normally performed after adding the correction weights to verify the wheel balancing. Some residual imbalance usually remains. The vector sum of the imbalance on the inner plane and the outer plane is the static imbalance. A further improvement to the novel method described above includes storing the amount and location of the residual static imbalance in the memory device for subsequent vector subtraction from the $\vec{U}b$ imbalance value calculated in equation (1) above to obtain a corrected imbalance. Another benefit of linking the off-car balancer 202 and the on-car runout device 10 is evident in the case when the off-car balancer 202 determines a relatively small imbalance. In such a case, adding the correction weight to the outside plane can be omitted until the wheel balancing is completed with the on-car runout device 10 to avoid superfluous rim weights. Accordingly, it may not be necessary to perform step 272 (FIG. 7), applying the balance weights, before mounting the tire/wheel assembly 12 on the on-car runout device 10. If the outer plane imbalance exceeds approximately 1.25 ounce, the weight should added off-vehicle because slight errors in angular location could leave significant remaining imbalance.

Since the on-car runout device 10 can rotate the tire/wheel assembly 12 by a controlled power drive, the processor 136 can also control the rotation of the tire/wheel assembly 12 to the calculated angular location at which to apply the correction weight. Starting or stopping the rotation at defined positions suffices to input the angular orientation required for vector calculations.

Different embodiments of the on-car runout device can have different runout measuring devices, such as one roller on the runout measuring arm, another roller linked to an encoder to determine the angular location of the wheel and a third roller driving the wheel. The functions of these three rollers are also optionally performed by combinations of one or two rollers. An encoder also is mountable on the drive roller and the drive roller is mountable on the runout measuring arm.

Measuring the runout in two locations on the tire/wheel assembly 12, both off-vehicle and on-vehicle, increases the sophistication of the integrated balancing system 200 and allows for the calculation of the magnitude and location of two correction weights to compensate for a dynamic imbalance. As described in U.S. Pat. No. 5,396,436, a particular method for calculating the dynamic imbalance condition of a tire/wheel assembly can be expressed as the combination of a static imbalance and a couple imbalance. The method using the combination of the static and couple imbalances is discussed herein, and other well known methods to calculate dynamic imbalance can also be used with the present invention.

When the tire/wheel assembly 12 is mounted on the vehicle hub 170, calculations of the static imbalance and couple imbalance of the tire/wheel assembly 12 are made based on the assumptions that the tire/wheel assembly 12 is properly balanced on the off-car balancer 202 and that the vehicle hub 170 and axle assembly are balanced.

Figure 8:
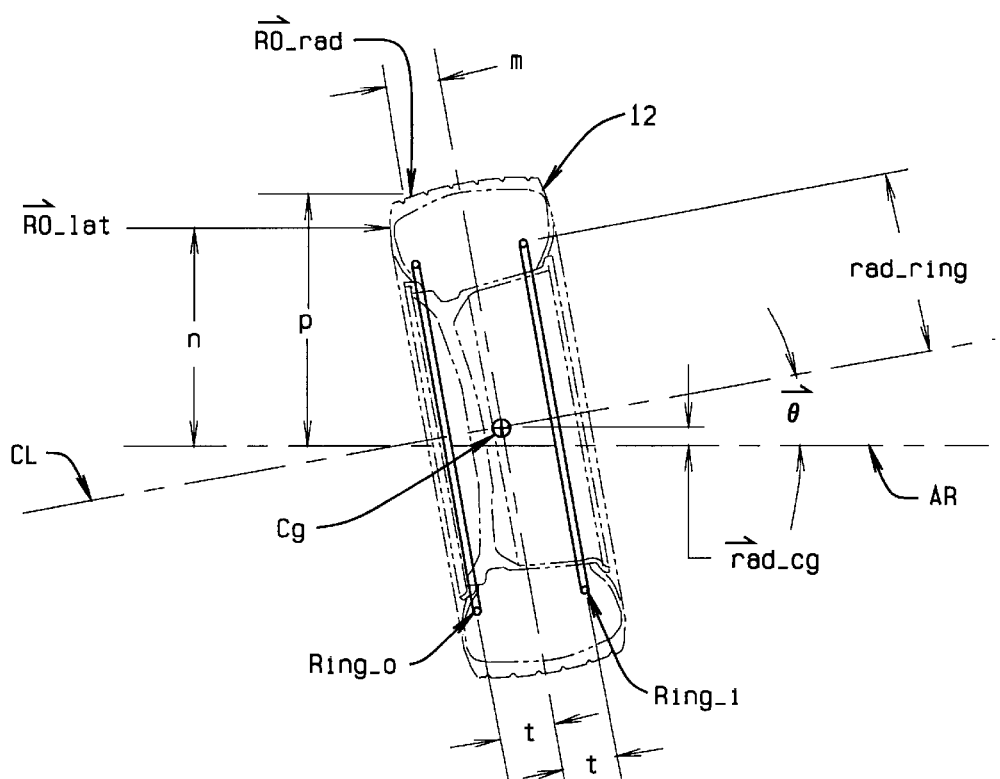
FIG. 8 is a schematic representation of a tire/wheel assembly.

FIG. 8 is a schematic representation of the tire/wheel assembly 12 that illustrates the variables in the following static imbalance equation (2) and couple imbalance equation (3).

$$\vec{S}\text{tatic\_imbalance} = (\vec{r}\,ad\_cg\_veh - \vec{r}\,ad\_cg\_bal) * Wt \qquad (2)$$

$$\vec{C}\text{ouple\_imbalance} = \pi * \rho_1 * rad\_\text{ring} * \sin(2 * \vec{\theta}\_veh) * (rad\_\text{ring}^2 - 2t^2) \qquad (3)$$

In FIG. 8, the tire/wheel assembly 12 is shown with its centerline CL out of line by angle $\vec{\theta}$ with the axis of rotation AR. The centerline CL is the tire/wheel assembly's principal inertia axis. The tire/wheel assembly's center of gravity Cg is offset from the axis of rotation AR by the distance of $\vec{r}\,ad\_cg$. The operation of two plane balancing reduces the magnitude of $\vec{r}\,ad\_cg$ and $\vec{\theta}$ to nearly zero. To simplify calculations, the tire/wheel assembly is modeled as two rings Ring_i and Ring_o, each having a radius of rad_ring from the centerline CL and axially offset from the center of gravity Cg by a separation distance t. Radial runout measurement $\vec{R}O\_\text{rad}$ is made at an average axial distance m from the center of gravity Cg and an average radial distance p from the axis of rotation AR. Lateral runout measurement $\vec{R}O\_\text{lat}$ is made at an average radial distance n from the axis of rotation AR.

The variables illustrated in FIG. 8 apply to a the tire/wheel assembly 12 when mounted on the off-car balancer 202 and when mounted on the vehicle hub 170. To identify the mounting the suffixes_bal and_veh are respectively used for the off-car balancer 202 and the vehicle hub 170. Vector variables must be quantified by a magnitude and an angle of rotation for the tire/wheel assembly and are identified with a superscript arrow.

The calculation of $\vec{r}\_ad\_cg$ for the vehicle is provided in equation (4) below.

$$\vec{r}\_ad\_cg\_veh = \frac{\vec{RO}\_rad\_veh - \vec{RO}\_rad\_bal}{2} - \frac{r\_w * (\cos(\theta\_w - \vec{\theta}\_veh) - \cos(\theta\_w + \vec{\theta}\_veh))}{2} \quad (4)$$

Where:

$$\theta\_w = \arctan\left(\frac{m}{p}\right)$$

$$r\_w = \sqrt{m^2 + p^2}$$

Wt=the total weight of the tire/wheel assembly $$\rho_l = \frac{Wt}{4 * \pi * rad\_ring} \text{ (the weight per unit length of Ring\_o and Ring\_i)}$$

$$\vec{\theta}\_veh = \arctan\left(\frac{\vec{RO}\_lat\_veh - \vec{RO}\_lat\_bal}{n}\right)$$

To determine the values for rad_ring, t, m, and Wt, estimates can be used based on information which the off-car balancer 202 can directly measure from the tire/wheel assembly 12 and based on stored information for typical wheels. To estimate the weight of the tire/wheel assembly 12, three measurable parameters which the balancer could use are the first natural resonance of the vibration-structure/tire/wheel assembly, the acceleration rate of the tire/wheel assembly and the axial location of the rim lips wto and wti. The value of the ring radius rad_ring could be found using the radial location of the RO_rad measurement and the radial location of the rim lips wto and wti. The value for dimensions m and t could be estimated by using the axial locations of the rim lips wto and wti along with the axial location of RO_lat. Values of rad_ring, t, m, and Wt that closely model a limited number of sample tire/wheel assemblies can be obtained from a testing lab, and a general purpose computer program such as MATLAB can be used to obtain equations which relate these values to the parameters which the off-car balancer 202 can directly measure.

The static imbalance and the couple imbalance can be calculated according to equations (2) and (3), respectively, and U.S. Pat. No. 5,396,436 further describes calculations for determining the amount and location of the correction weights for balancing the tire/wheel assembly.

Compensation for hub cap induced imbalances is another feature of the present invention. Among the possible causes are significant weight, misalignment, incorrect installation and bent or broken hub caps. The hub cap imbalance correction weight calculation is analogous to the static imbalance wheel calculation utilizing a radial runout magnitude of the hub cap measured by the on-vehicle runout measuring arm on a hubcap surface lying substantially in the same plane as the outer plane from the off-vehicle dynamic balancing procedure. The hubcap runout magnitude and the measured weight of the hubcap will substitute for $\vec{R}oVeh$ and WtWhl respectively in equation (1). DiaUb in equation (1) will be the diameter of the correction weight placement on the outer plane and $\vec{R}oBal$ is zero. The imbalancing effect of the hubcap is then equivalent to the resulting calculated weight Ub placed at the hubcap runout angular location, with the diameter DiaUb on the outer correction plane. This imbalance can then readily be corrected by the placement of a correction weight equal to Ub, at DiaUb on the outer correction plane with an angular location 180° opposite that of the hubcap runout.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the contemplated uses.

As various modifications could be made in the constructions and methods herein described and illustrated without departing from the scope of the invention, it is intended that all matter contained in the foregoing description or shown in the accompanying drawings shall be interpreted as illustrative rather than limiting. For example, sensor devices other than a measurement arm or a linear potentiometer may be used to measure runout, such as a rotary potentiometer, a magneto resistive sensor or a LVDT (linear variable differential transformer). Additionally, non-contacting sensors may also be used, such as an ultra sonic sensor, a capacitance sensor, or an optical sensor. The on-car runout device could also include a scale for weighing the tire/wheel assembly. Thus, the breadth and scope of the present invention should not be limited by any of the above-described exemplary embodiments, but should be defined only in accordance with the following claims appended hereto and their equivalents.

What is claimed is:

1. A device for reducing runout in a tire/wheel assembly when mounted on a vehicle hub, comprising:
    an on-car runout device operatively engaged with the vehicle hub, said on-car runout device generating hub runout information;
    a computer operatively communicating with said on-car runout device, said computer receiving said hub runout information and performing calculations to determine a preferred mounting orientation of the tire/wheel assembly on the vehicle hub.

2. A device as set forth in claim 1, wherein said hub runout information includes runout data for a plurality of studs.

3. A device as set forth in claim 1, wherein said hub runout information includes runout data for a hub pilot diameter.

4. A device as set forth in claim 1, wherein said on-car runout device is a runout measuring arm.

5. A device as set forth in claim 1, further comprising a display operatively communicating with said computer.

6. A device as set forth in claim 1, further comprising a powered roller operatively engaged with the tire/wheel assembly.

7. A device as set forth in claim 6, wherein said on-car runout device operatively engages the tire/wheel assembly and said powered roller rotates the tire/wheel assembly below approximately 300 rotations per minute, said on-car runout device generating tire/wheel assembly runout information while said powered roller rotates the tire/wheel assembly.

8. A device as set forth in claim 7, further comprising a communications link and an off-car balancer, said communications link connecting said on-car runout device with said off-car balancer.

9. An integrated balancing system for correcting imbalance in a tire/wheel assembly, comprising:
    an off-car balancer, said off-car balancer measuring an off-car balance condition of the tire/wheel assembly and measuring an off-car runout of a surface of the tire/wheel assembly while the tire/wheel assembly is mounted thereon;

an on-car runout device, said on-car runout device measuring an on-car runout of said surface of the tire/wheel assembly while the tire/wheel assembly is mounted on a vehicle hub; and a computer operatively communicating with said off-car balancer and said on-car runout device through a communication link.

10. An integrated balance system as set forth in claim 9 wherein said on-car runout device and said off-car balancer measure radial runout.

11. An integrated balance system as set forth in claim 9 wherein said computer calculates a mass and a location for a balance weight based on said off-car balance condition, said balance weight counteracting the imbalance.

12. An integrated balance system as set forth in claim 11 wherein the off-car runout and the on-car runout have a difference, and wherein said computer calculates a mass and a location of a final balance weight, said final balance weight counteracting said difference between said off-car runout and said on-car runout.

13. An integrated balance system as set forth in claim 9 wherein the tire/wheel assembly has a second surface and said on-car runout device and said off-car balancer respectively measure runout on said second surface of the tire/wheel assembly.

14. An integrated balance system as set forth in claim 13 wherein said computer calculates a plurality of masses and a plurality of locations for a plurality of balance weights based on said off-car balance condition, said plurality of balance weights dynamically counteracting the imbalance.

15. An integrated balance system as set forth in claim 14 wherein the off-car runout and the on-car runout have a difference, and wherein said computer calculates a plurality of masses and a plurality of locations of a plurality of final balance weights, said final balance weights counteracting said difference between said off-car runout and said on-car runout.

16. An integrated balance system as set forth in claim 9 wherein said computer is integral with said off-car balancer.

17. An integrated balance system as set forth in claim 9 wherein said communication link is an operator manually entering said off-car runout into said computer.

18. An integrated balance system as set forth in claim 9 wherein said communication link is an electronic memory device.

19. A method for improving on-car mounting of a tire/wheel assembly having a predetermined runout high spot location, comprising the steps of:

measuring a radial runout of a vehicle hub;

communicating said radial runout to a computer;

calculating a location of a maximum hub runout within said computer;

displaying said location of said maximum hub runout; and mounting the tire/wheel assembly to said vehicle hub with the predetermined runout high spot location opposite to said maximum hub runout.

20. A method for improving on-car mounting according to claim 19, wherein said predetermined high spot is a tire mark made by a tire manufacturer.

21. A method for improving on-car mounting according to claim 19, wherein said predetermined runout high spot location is an angular location of an off-car runout determined by an off-car balancer for a surface of the tire/wheel assembly.

22. A method for improving on-car mounting according to claim 21, further comprising the step of measuring an on-car runout of said surface of the tire/wheel assembly.

23. A method for improving on-car mounting according to claim 22, further comprising the step of communicating said off-car runout and said on-car runout to said computer.

24. A method for improving on-car mounting according to claim 23, further comprising the step of calculating a difference between said off-car runout and said on-car runout.

25. A method for improving on-car mounting according to claim 24, further comprising the step of calculating a mass and a location of a final balance weight to counteract said difference between said off-car runout and said on-car runout.

26. A method for improving on-car mounting according to claim 19, further comprising the step of automatically displaying an alert when said maximum hub runout exceeds a a preset level.

27. A method for correcting an imbalance in a tire/wheel assembly, comprising the steps of:

mounting the tire/wheel assembly on an off-car balancer;

measuring the imbalance of the tire/wheel assembly while the tire/wheel assembly is rotated on said off-car balancer;

measuring an off-car runout of a surface of the tire/wheel assembly;

calculating an amount and an angular location of a balance weight to counteract the imbalance;

subsequently mounting the tire/wheel assembly on a vehicle hub;

measuring an on-car runout of said surface of the tire/wheel assembly;

communicating said off-car runout and said on-car runout to a computer;

calculating a difference between said off-car runout and said on-car runout; and calculating an amount and a location of a final balance weight to counteract said difference between said off-car runout and said on-car runout.

28. A method as set forth in claim 27 further comprising the step of applying said balance weight to counteract said imbalance while the tire/wheel assembly is mounted on said off-car balancer.

29. A method as set forth in claim 28 further comprising the steps of measuring a residual imbalance remaining after applying said balance weight and calculating a runout imbalance resulting from said difference between said off-car runout and said on-car runout.

30. A method as set forth in claim 29 further comprising the step of adding said residual imbalance and said runout imbalance to obtain a corrected imbalance.

31. A method as set forth in claim 30 further comprising the step of calculating an amount and a location of a corrected balance weight for counteracting said corrected imbalance.

32. An on-car runout device for measuring runout in a tire/wheel assembly that is mounted on a vehicle hub, comprising:

a powered roller operatively engaged with the tire/wheel assembly; said powered roller rotating said tire/wheel assembly below approximately 300 rotations per minute in an unloaded condition;

a runout measuring device operatively engaged with a surface of the tire/wheel assembly, said runout measuring device generating runout information for said surface of the tire/wheel assembly while said powered roller rotates the tire/wheel assembly;

a computer operatively communicating with said runout measuring device, said computer receiving said runout information;

a sensor connection operatively linking said runout measuring device and said computer, said runout measuring device transmitting said runout information over said sensor connection to said computer; and a display operatively communicating with said computer.

* * * * *